United States Patent [19]

Flanigan

[11] Patent Number: 5,703,276
[45] Date of Patent: Dec. 30, 1997

[54] ONE-WINDOW CELL FOR TESTING PASSIVE REMOTE VAPOR DETECTORS

[75] Inventor: Dennis F. Flanigan, Baltimore, Md.

[73] Assignee: The United States of America as represented by the Secretary of the Army, Washington, D.C.

[21] Appl. No.: 655,525

[22] Filed: May 30, 1996

[51] Int. Cl.[6] .................. G01J 5/06; G01N 21/61
[52] U.S. Cl. .......... 73/1.02; 250/252.1; 250/341.5; 374/2
[58] Field of Search .................. 73/1 G, 1.02, 1.06, 73/1.07; 250/252.1 R, 341.5, 252.1 A; 374/2

[56] References Cited

U.S. PATENT DOCUMENTS

| 3,383,902 | 5/1968 | Cragin et al. ............... 374/2 |
| 3,936,196 | 2/1976 | Wickersheim ............... 356/246 |
| 4,387,301 | 6/1983 | Winick et al. ............... 250/252.1 A |
| 4,914,720 | 4/1990 | Knudle et al. ............... 250/252.1 A X |
| 5,003,175 | 3/1991 | Fabinski et al. ............... 73/1 G X |
| 5,089,749 | 2/1992 | Cadogan ............... 250/252.1 R X |
| 5,128,884 | 7/1992 | Prager ............... 250/252.1 A X |
| 5,184,017 | 2/1993 | Tury et al. ............... 250/252.1 A X |
| 5,206,511 | 4/1993 | Apperson et al. ............... 250/252.1 A X |
| 5,510,269 | 4/1996 | Black et al. ............... 250/252.1 A X |
| 5,602,389 | 2/1997 | Kato et al. ............... 250/493.1 X |

OTHER PUBLICATIONS

D. F. Flanigan, "Cell for testing passive remote-sensing vapor detectors", Applied Optics, vol. 34, No. 33, Nov. 20, 1995 pp. 7714-7717.

D.F. Flanigan, "Chamber Optics For Testing Passive Remote Sensing Vapor Detectors," ERDEC-TR-217, Nov. 1993 pp. 9-53.

*Primary Examiner*—Thomas P. Noland
*Attorney, Agent, or Firm*—Ulysses John Biffoni; Edward L. Stolarun

[57] ABSTRACT

A cell for testing passive remote vapor detectors has a cell body with a blackbody radiation source attached to a first end and a window attached to a second end. The blackbody radiation source and the window seal the first and second ends, so that a hazardous vapor can be easily contained. With this arrangement, it is easy to account for the effects of the window on output radiation and thus to calculate radiance and temperature quantities of interest.

2 Claims, 1 Drawing Sheet

ONE-WINDOW CELL FOR TESTING PASSIVE REMOTE VAPOR DETECTORS

GOVERNMENTAL INTEREST

The invention described herein may be manufactured, used and licensed by or for the United States Government.

BACKGROUND OF THE INVENTION

The invention is directed to a cell for testing passive remote vapor detectors, the cell holding a vapor which is disposed between a background radiation source and a sensor to be tested.

DESCRIPTION OF THE PRIOR ART

There is a requirement for the controlled testing of remote sensing hazardous vapor detectors. Passive spectroradiometric sensors operate on the basis of a small temperature difference, ΔT, between the temperature of target cloud of hazardous vapor and the background temperature. Open-air testing with hazardous materials can rarely be done. The alternative is to test the sensor under controlled conditions with backup testing in the environment with non-hazardous alternatives. Natural temperature differences range from a fraction of a degree Kelvin to 20° K. or more. Most laboratory testing is done in the 1° to 5° K. range. There are substantial difficulties in getting accurate and reproducible ΔT's in this range, as will be explained in greater detail below.

A conventional vapor cell for laboratory testing of remote vapor detectors will now be described with respect to FIG. 1, which shows sensor 10 and vapor cell assembly 100 which is used to test it. This vapor cell assembly includes background source 102 and vapor cell 104, which holds vapor 106 between windows 108 and 110. As those skilled in the art will readily appreciate, the assembly may include other optics such as lenses, which have been omitted from FIG. 1 for simplicity. In this specification, windows 108 and 110 will be referred to as the meso window and the ecto window because of their relative positions within the assembly.

Vapor may be introduced by a number of techniques either statically or dynamically. The sensor may first be tested without the vapor to obtain a background reading. This is generally all that is required when the radiation source is at high temperature. However, when the experiment requires that the source be just a few degrees above (or below) the temperature of the target vapor (or aerosol), the windows will introduce effects that must be allowed for if accurate quantitative data are required. One potential technique is a windowless cell (introduced by personnel at the Dugway Proving Ground (DPG) and tested on May 3, 1993); however, a stable safe cell is extremely difficult to achieve.

In testing, radiation from source 102 passes through vapor cell 104 to sensor 10. A quantity of target vapor of interest is detected by the sensor as ΔT, which is defined as the difference between the radiometric temperature (degrees Kelvin) of the background and the temperature of the air mass containing the chemical target vapor. The sensor sees ΔT as a spectral contrast. In regions of strong bands, the temperature will be more heavily weighted in favor of the temperature of the vapor cloud. In regions of low atmospheric absorption, the radiometric temperature will be more a measure of the background temperature. The polarity of the ΔT will depend on the temperature of the background relative to the target vapor; the vapor will be seen as absorber against a hotter background or as an emitter against a colder reference source. ΔT also varies continuously with spectral range and may change polarity. Although most specifications for sensors are stated in terms of the required ΔT, the more fundamental quantity is a difference in radiance, ΔL (watts per square centimeter per steradian per wave number), which is defined as $$\Delta L = L_v - L_{bg} \quad (1)$$

where $L_v$ is radiance of the target vapor at some wave number and $L_{bg}$ is the radiance of the background.

The baseline testing of passive infrared sensors at zero range would be best done without the complication of cell windows 108 and 110. Because of the hazardous nature of the target compounds, this is difficult to achieve. The introduction of optical elements changes the apparent ΔT as seen by the sensor. This matter will now be discussed in greater detail.

There are two constraints in designing the optics of a system to measure the capabilities of remote vapor detectors. First, the background and the target cloud must fill the field-of-view (FOV) of the sensor. The limiting throughput or étendue must be that of the sensor. Second, the effective radiometric temperature of the background source and the target vapor must be accurately known and reproducible. If the source is sufficiently large to fill the FOV of the sensor, many complications can be avoided. If not, telescopes need to be considered.

Establishing the effective ΔT depends on more than just knowing the temperatures of the target vapor and background source. Optics constraining the vapor and/or directing the beam change the effective radiance level because of transmissive losses, reflective gains, emission and absorption. Obliquely aligned windows or true beamsplitters are to be avoided because they bifurcate the line-of-sight (LOS). The possibly unintended branch may be coming from the wall of the vapor cell or from warm instruments, people walking around the room, etc. If beamsplitters are used, they should be angled sufficiently that they add an unambiguous FOV terminated by a known and characterized baffle. In a high temperature source experiment, or where the source is modulated, these contributions may be insignificant or easily rejected by electronic filtering.

The disadvantage of orthogonal windows is retro reflection of the sensor beam (the Narcissus effect) and subsequent sources back into the sensor or even multiple reflections. Radiation may originate from various sources either in the direction from the background source to the sensor or in the direction from the sensor to the background source; radiation in the latter direction is reflected back to the sensor. In this specification, "first order" is defined as radiation originating along the path that travels directly to the sensor. Second order is radiation traveling in the direction of sensor to the background source that is once reflected back to the sensor. Third order is radiation traveling to the sensor that is twice reflected back to the sensor, etc. The analysis in this specification covers only first and second order components, although it will be shown that in the proposed cell only first order radiation is important.

The problem is visualized as a series of layers, each homogenous and isothermal, as shown in FIG. 2. The radiance out of each layer in the direction of interest is the input radiance from the previous and subsequent layers. The general approach is to trace a ray from the background source to the sensor using the total power law for each layer.

After completing the forward trace, the ray from the sensor to the background source will be traced to fill in the reflected (second order) quantities. The LOS will include optical elements and vapors in its traversal from sources to detector. Each element can be considered a layer that may emit, reflect, and transmit energy, the total of which is defined by $$\epsilon + \rho + \tau = 1 \tag{2}$$

where $\epsilon$ is the emissivity (equal to the absorptivity), $\rho$ is the reflectivity, and $\tau$ is the transmissivity. In general it is assumed that $\rho$ defines light reflected or scattered from the entire hemisphere into the FOV. In this treatment, reflectance will be restricted to smooth surfaces that will not scatter stray light into the FOV.

The objective of the analysis is to determine the $\Delta L$ on the sensor. As shown in FIG. 1, the sensor 10 is on the left and is the final element; the background source is on the right. Therefore, the overall direction is right to left. In FIG. 2, the power law for a single layer n traveling from right to left is $$L_n = \tau L_{n-1} + \epsilon L_n^{bb} + \rho L'_{n+1} \tag{3}$$

where $L_{n-1}$ is the radiance incident on layer n from layer n−1, $L_n^{bb}$ is the radiance from a blackbody at the temperature of layer n, $L'_{n+1}$ is a radiance incident on layer n from the direction of the sensor.

Consider the configuration shown in FIG. 1, where the source completely fills the sensor FOV. Assume only intervening optics are the vapor cell windows and that the experiment is conducted in a nitrogen atmosphere so that atmospheric absorption and emission are not complications. First, the total power law is applied to the background source, which is assumed to be a blackbody; therefore, $\epsilon = 1$, $\tau = 0$, and $\rho = 0$. The radiance of the first layer is the radiance of a blackbody at the temperature of the background:

$$L_1 = L_{b_t}^{bb} \tag{4}$$

Next, the total power law is applied to the first window. The radiance from layer 2, in the direction of the sensor, is $$L_2 = \rho_2 L'_3 + \tau_2 L_1 + \epsilon_2 L_2^{bb} \tag{5}$$

where $\rho_2$ is the reflectivity of the window, $L'_3$ is radiance from layer 3, $\tau_2$ is the transmittance of the window, $\epsilon_2$ is the emittance of the window, and $L_2^{bb}$ is the radiance of a blackbody at the temperature of the window. Next, the total power law is applied to the vapor contained in the cell. Since vapors do not scatter significantly in the infrared there will be no reflectance, only transmittance and emittance. The radiance from layer 3, in the direction of the sensor, is $$L_3 = \epsilon_3 L_3^{bb} + \tau_3 L_2 \tag{6}$$

where $\epsilon_3$ is the emittance of the vapor; $L_3^{bb}$ is the radiance of a blackbody at the temperature of the vapor, and $\tau_3$ is the transmittance of the vapor. Next, the second window is encountered, not necessarily with the same transmittance, reflectance and emittance as the first window. The radiance from this window (layer 4) in the direction of the sensor is $$L_4 = \rho_4 L'_5 + \tau_4 L_3 + \epsilon_4 L_4^{bb} \tag{7}$$

which is the radiance incident on the sensor. The ray is now traced from the sensor to the background source to get the L' quantities. Layer 5 is the sensor, so $$L'_5 = L_s \tag{8}$$

For layer 4 (the second window) the radiance in the direction of the background source is $$L'_4 = \tau_4 L'_5 + \epsilon_4 L_4^{bb} \tag{9}$$

For the vapor layer $$L'_3 = \epsilon_3 L_3^{bb} + \tau_3 L'_4 \tag{10}$$

The radiation exiting the first window in the direction of the background source (layer 2) is totally absorbed by the blackbody source; therefore, there are no more contributions to the second order radiation. The radiance from all layers incident on the sensor, $L_4$, after substitution of the Eqs. (4), (5), (6), (8), (9), and (10) into Eq. (7) is $$L_4 = \epsilon_4 L_4^{bb} + \rho_4 L_s + \tau_4(\epsilon_3 L_3^{bb} + \tau_3(\epsilon_2 L_2^{bb} + L_1 \tau_2 + \rho_2(\epsilon_3 L_3^{bb} + \tau_3(\epsilon_4 L_4^{bb} + L_s \tau_4)))) \tag{11}$$

At this point it would be convenient to substitute names for layer numbers. The output radiance of layer 4 is the radiance incident on the sensor and is generalized to L. Layer 1 is the blackbody background source defined by Eq. (4). Layer 2 is the first window which is defined as the "meso" (between the background and vapor sources) window. The second window is defined as the "ecto" (outside the vapor and background sources) window. The subscripts M and E will be used respectively. The subscript "V" (vapor) is substituted for layer 3.

$$L = \epsilon_E L_E^{bb} + \rho_E L_s + \tau_E(\epsilon_v L_v^{bb} + \tau_v(\epsilon_M L_M^{bb} + \tau_M L_{b_t}^{bb} + \rho_M(\epsilon_v L_v^{bb} + \tau_v(\epsilon_E L_E^{bb} + \tau_E L_s)))) \tag{12}$$

Solving Eq. (12) for the background radiance $$L_{b_t}^{bb} = \frac{(L - \epsilon_E L_E^{bb} - \rho_E L_s - \tau_E \epsilon_v L_v^{bb} - \tau_v \tau_E \epsilon_M L_M^{bb} - \frac{\rho_M \tau_v \tau_E \epsilon_v L_v^{bb} - \rho_M \tau_v^2 \tau_E \epsilon_E L_E^{bb} - \rho_M \tau_v^2 \tau_E^2 L_s)}{(\tau_M \tau_v \tau_E)}} \tag{13}$$

It can be seen from Eq. (13) that the background radiance cannot be calculated without knowledge of the source and optical element radiances and is subject to change during the experiment. To determine the contributions of the different windows first the ecto-window is removed. The background radiance becomes $$L_{b_t}^{bb} = \frac{L - \epsilon_v L_v^{bb} - \tau_v \epsilon_M L_M^{bb} - \rho_M \tau_v \epsilon_v L_v^{bb} - \rho_M \tau_v^2 L_s}{\tau_M \tau_v} \tag{14}$$

a simpler expression, but still containing terms with test vapor emittance and/or transmittance and element or sensor radiances. Removing the meso-window gives the following:

$$L_{b_t}^{bb} = \frac{L - \epsilon_E L_E^{bb} - \rho_E L_s - \tau_E \epsilon_v L_v^{bb}}{\tau_v \tau_E} \tag{15}$$

an expression where test vapor transmittance or emittance terms have been separated from optical element or sensor radiances. This suggests to the inventor a vapor cell with a window on one end and a blackbody source directly connected to the other end; this is called the "ectocell." See FIG. 3.

The total radiance incident on the sensor for an ectocell is $$L = \epsilon_E L_E^{bb} + \rho_E L_s + \tau_E(\epsilon_v L_v^{bb} + \tau_v L_{b_t}^{bb}) \tag{16}$$

The best radiometric solution would be to build a cell without windows; of course, as noted above, that is not practical. In a review of the Dugway Proving Ground experiment with a cell without windows, the inventor suggested the addition of an ecto window; with this modification, the Dugway Proving Ground personnel were able to stabilize the cell sufficiently to complete their experiment. However, such a one-window cell still posed a problem insofar as it required a complicated design to ensure that hazardous vapors did not escape by the remaining open end.

It will be seen from the discussion above and particularly from Eq. (13) that it is difficult to isolate $\Delta L_0$ from the effects of the meso window.

This and other difficulties have been discussed in detail in the following references, which are hereby incorporated by reference in their entireties into this specification:

1. D. Gladden, J. White, S. Brimhall, M. Marshall, and A. Bruxton, "Abbreviated Test Report for the RRP Chamber Validation—DPG Phase II of the XM21 Remote Sensing Chemical Agent Alarm," Available from Army Test and Evaluation Command, Troop Support Division, Attn.: AMSTE-TA-TS, Aberdeen Proving Ground, Md. 21005-5055.
2. D. F. Flanigan, "Chamber Optics for Testing Passive Remote Sensing Vapor Detectors," ERDEC-TR-127, Nov. 1993 (Available from Defense Technical Information Center, Cameron Station, Alexandria, Va. 22304-6145).
3. B. T. Smith, "Summary Review of Technical Report: Chamber Optics for Testing Passive Remote Sensing Vapor Detectors," Battelle, 505 King Ave., Columbus, Ohio 43201 (Nov. 4, 1993), Available from the Project Manager for NBC Defense Systems, Attn.: AMCPM-NN, Aberdeen Proving Ground, Md. 21010-5423.
4. D. Flanigan, "Cell for Testing Passive Remove-Sensing Vapor Detectors," Appl. Opt., 34, 7714, (1995)

SUMMARY OF THE INVENTION

It is an object of the present invention to provide a cell for testing passive remote vapor detectors in which $\Delta L_0$ is easily derived from the outputs of the detectors being tested.

It is a further object of the present invention to provide such a cell in which a hazardous vapor is safely contained.

To these and other ends, the present invention is directed to a cell, called the "ectocell" by the inventor, in which the meso window is removed and the background source is directly attached to the cell to contain the vapor.

Removing the meso window and attaching the source directly to the cell essentially eliminates those components of the radiation contributed by the cell and sensor that are modified by the introduction of a test vapor. The cell and sensor continue to contribute radiation components, but these are easily subtracted out in an experiment where the baseline is established by the empty cell.

A novel feature is the concept of replacing the meso window by the source. This can be easily done in low temperature source measurements because of the small temperature gradient from the source to the test vapor.

BRIEF DESCRIPTION OF THE DRAWINGS

The invention will now be set forth in further detail with reference to the drawings, in which.

DETAILED DESCRIPTION OF THE PREFERRED EMBODIMENT

Figure 1:
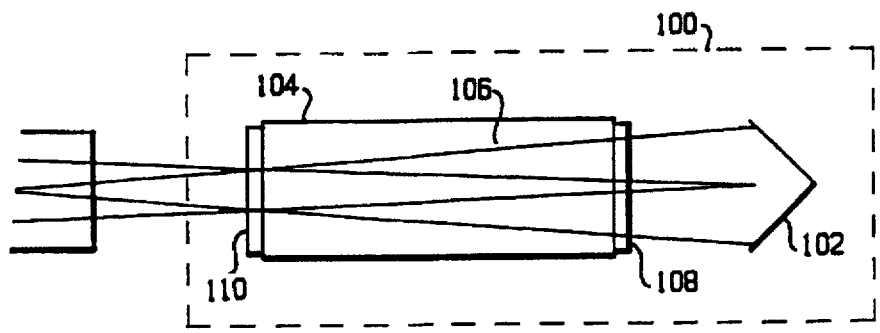
FIG. 1 shows a schematic diagram of a two-window cell according to the prior art.
Figure 2:
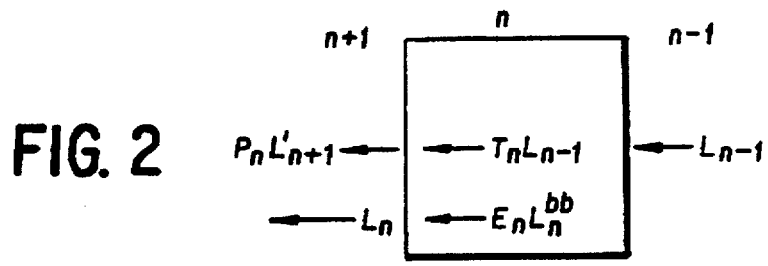
FIG. 2 shows a diagram illustrating the concept of layers which is used to explain the operation of both the prior art and the invention.
Figure 3:
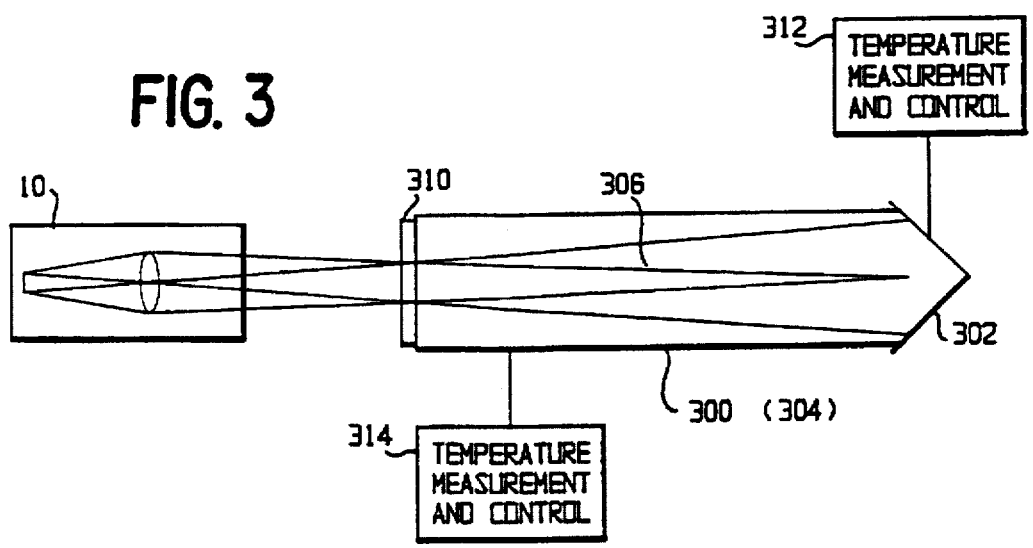
FIG. 3 shows a schematic diagram of a one-window cell according to a preferred embodiment of the invention.

A vapor cell according to a preferred embodiment of the invention—namely, an ectocell—is shown in FIG. 3 in conjunction with sensor 10 to be tested. Vapor cell 304 differs from that of the prior art in that there is no meso window; instead, background source 302, which is preferably a blackbody source, is directly attached to the vapor cell so that the source and ecto window 310 contain vapor 306. Thus, the vapor cell forms assembly 300, in contrast to assembly 100 of the prior art, in which the source and cell are separate. This cell and the cell of the prior art can be used in the same manner.

The cell body of vapor cell 304 can be any conventional material: glass, metal or plastic. The window must be sufficiently orthogonal to the beam so that a stray line-of-sight (LOS) is not introduced (in addition to the intended LOS). The window may be emissive. In the preferred embodiment, the background source closely approaches a blackbody in performance so as not to (1) be difficult to calibrate and (2) reflect radiation from the sensor and test vapor back to the sensor. The window and the background source are tightly sealed (conventional for a gas cell) to the body of the cell. The cell may have provisions for independently controlling and measuring the temperatures of the test vapor and background source, such as temperature measurement and control means 312 and 314.

In light of these considerations and of known vapor cells such as cell 104, those skilled in the art who have reviewed this specification will readily understand how to make and use a vapor cell such as cell 304.

The advantages of the invention will now be described with reference to Equations (1) through (16) above.

Consider a time based experiment. After setting $L=L_{t1}$; $\tau_v=\tau_{v1}$; $\epsilon_v=\epsilon_{v1}$ in Eq. (16) at some time, $t_1$ and $L=L_{t2}$; $\tau_v=\tau_{v2}$; $\epsilon_v=\epsilon_{v2}$ at some later time, $t_2$ and subtracting we get $$L_{t2}-L_{t1}=\tau_E[(\epsilon_{v2}-\epsilon_{v1})L_v^{bb}+(\tau_{v2}-\tau_{v1})L_{b_g}^{bb}] \quad (17)$$

In this ectocell case the sensor and window radiance terms have canceled; only the transmittance of the ecto-window, and the concentration and source temperature differences effect this differential measurement.

$\Delta L_0$, the allowed radiance difference for testing detector performance, is a test specified quantity. The background source radiance needed to produce $\Delta L_0$ can be determined from Eq. (17) by noting that at time 1 there is no vapor present and $\tau_{v1}=1$; $\epsilon_{v1}=0$. The maximum contrast would occur if the target vapor completely obscured the background source at time 2, therefore $\tau_{v2}=0$; $\epsilon_{v2}=1$, and $$\Delta L_0=\tau_E(L_v^{bb}-L_{b_g}^{bb}), \quad (18)$$

The background radiance needed to compensate for the ecto-window losses is $$L_{b_g}^{bb}=L_v^{bb}-\frac{\Delta L_0}{\tau_E} \quad (19)$$

from which it can be seen that the only factor necessary to compute the required background radiance to achieve a specified $\Delta L_0$ is the ecto-window transmittance.

The principal use for the ectocell is the laboratory testing of passive infrared remote sensing hazardous vapor detectors either for chemical defense or hazardous site monitoring. The ectocell may also have a basic research use in determining temperature dependent absorption coefficients of test vapors and aerosols. A similar cell concept may also have use for testing laser remote sensors, where the source is replaced by a calibrated reflector. Because those skilled in the art who have reviewed this specification will readily understand how to make these and other modifications within the scope of the invention, the invention is to be limited not by the preferred embodiment, but only by the claims.

I claim:

1. A one-window cell for testing passive remote vapor detectors comprising:

a cell body for containing a vapor, the cell body having a first end and a second end;

a blackbody radiation source for emitting radiation, the blackbody radiation source being attached to the first end of the cell body to seal the first end of the cell body;

a window, at least partially transparent to the radiation emitted by the blackbody radiation source, attached to the second end of the cell body to seal the second end of the cell body;

first temperature measurement and control means for measuring and controlling a temperature of the blackbody radiation source; and second temperature measurement and control means for measuring and controlling a temperature of the vapor.

2. A one-window cell as in claim 1, wherein the blackbody radiation source and the window lie along a common optical axis to which the window is orthogonal.

* * * * *